E. J. McCRABB.
CORN HARVESTER AND HUSKING MACHINE.
APPLICATION FILED JULY 3, 1913.
1,109,688.
Patented Sept. 8, 1914.
4 SHEETS—SHEET 1.
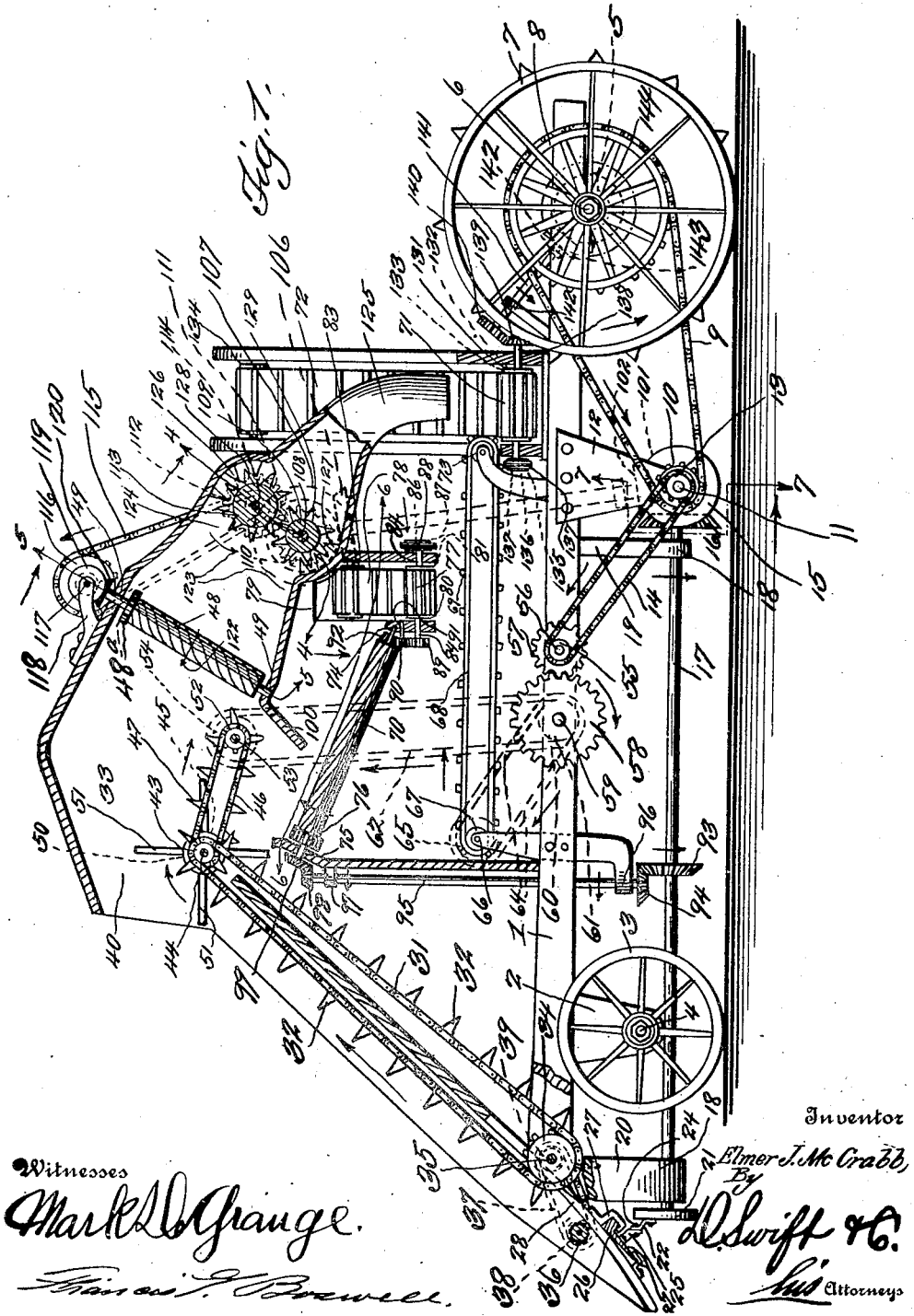

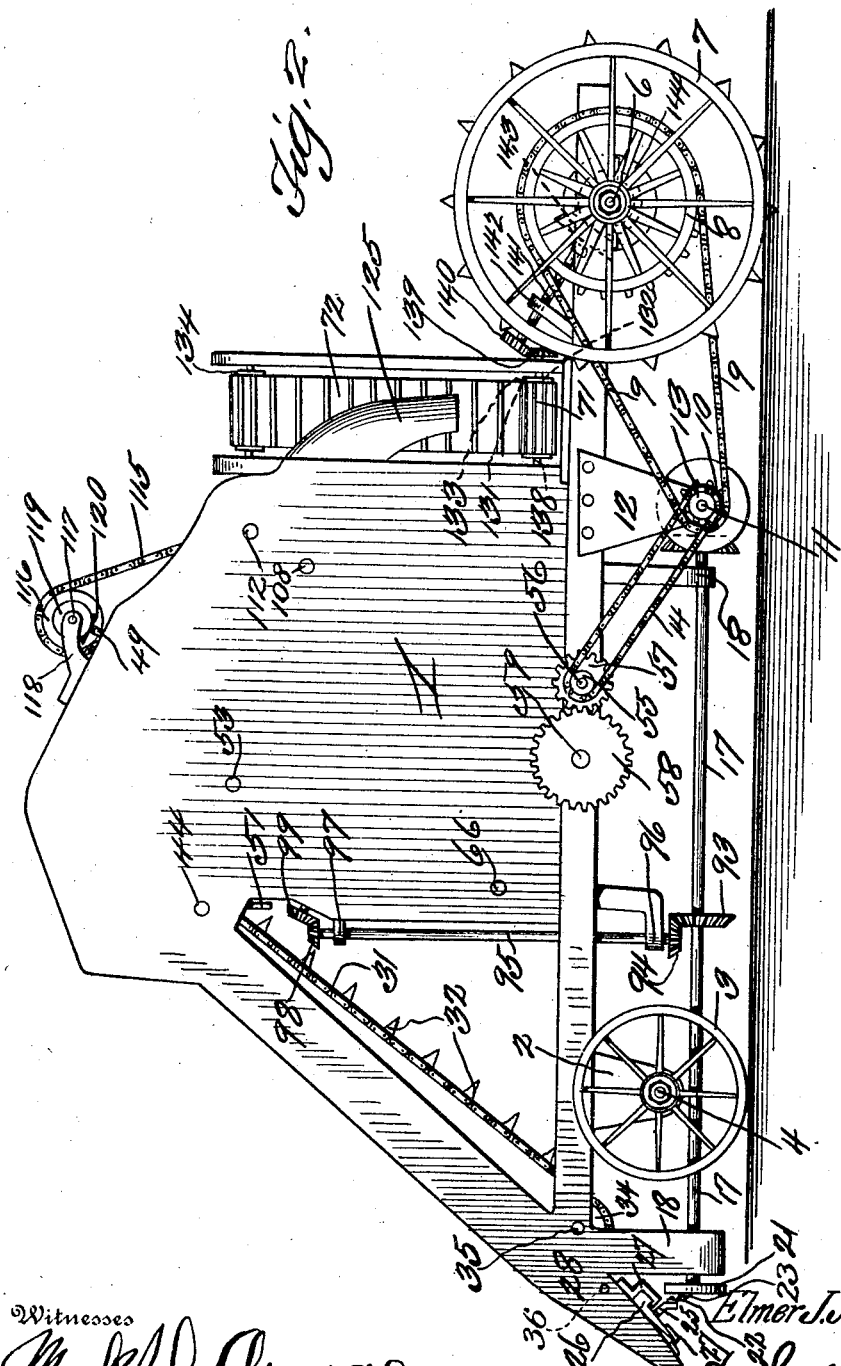

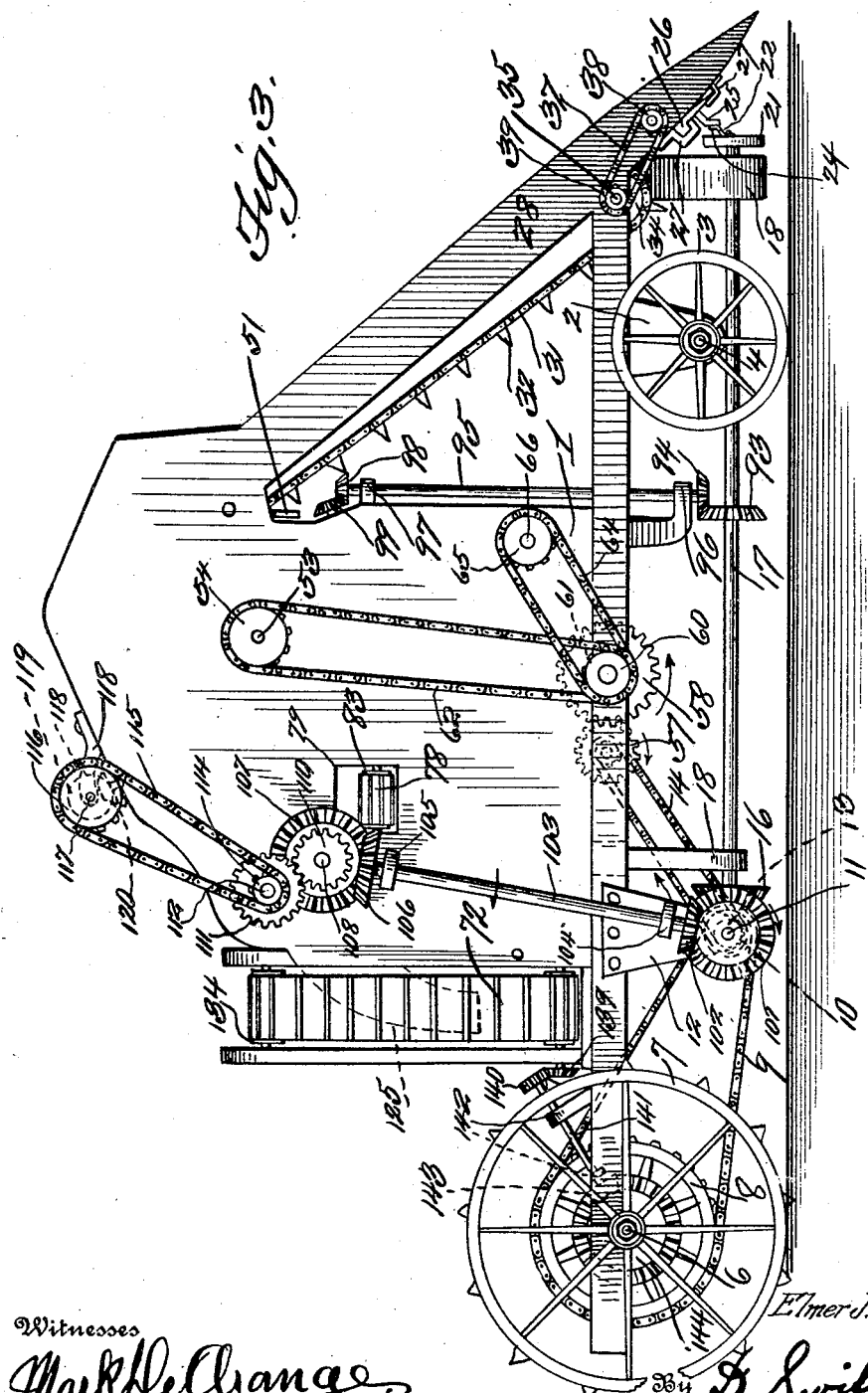

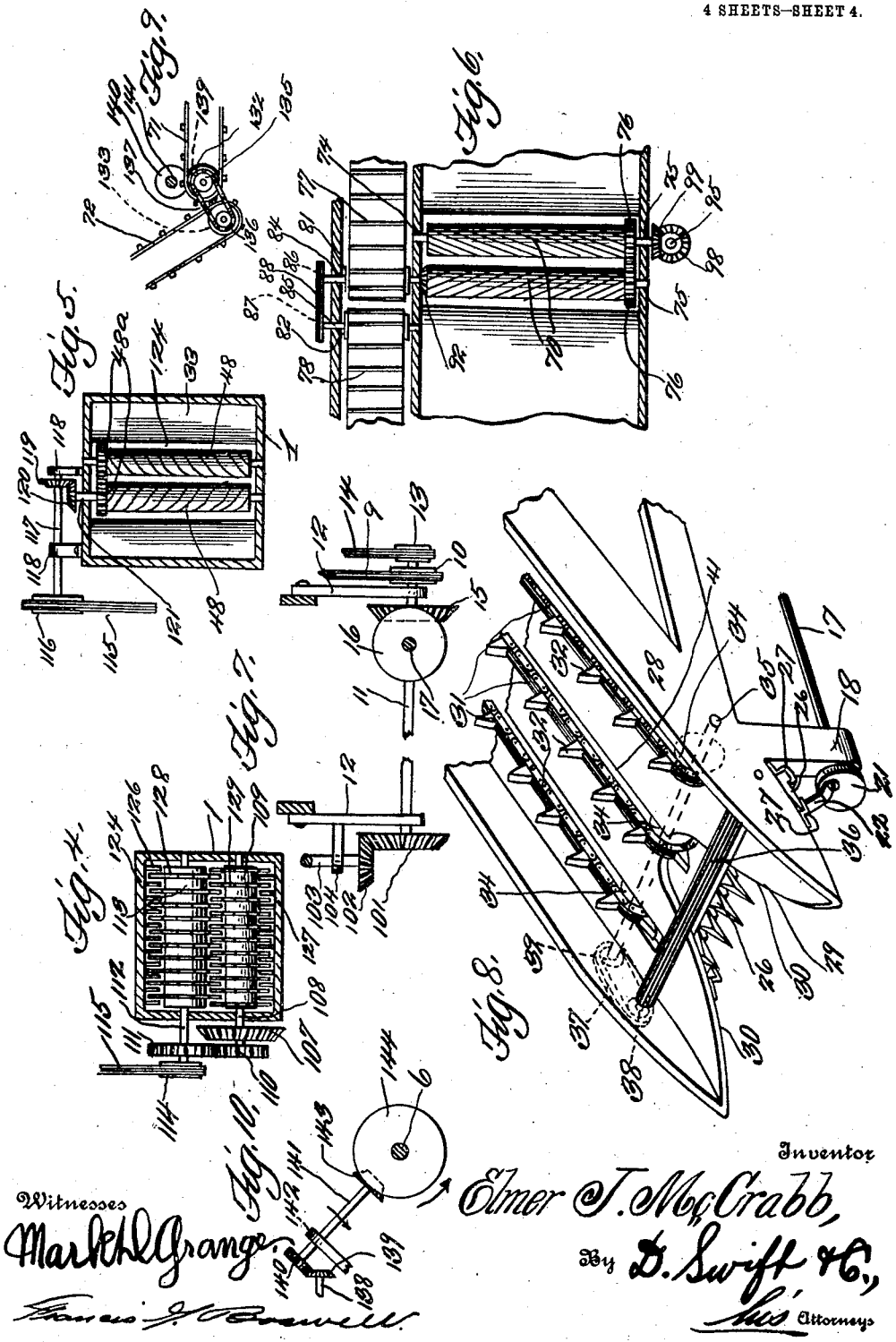

UNITED STATES PATENT OFFICE.

ELMER J. McCRABB, OF SIGOURNEY, IOWA.

CORN HARVESTER AND HUSKING MACHINE.

1,109,688.  Specification of Letters Patent.  Patented Sept. 8, 1914.

Application filed July 3, 1913. Serial No. 777,281.

*To all whom it may concern:*

Be it known that I, ELMER J. McCRABB, a citizen of the United States, residing at Sigourney, in the county of Keokuk and State of Iowa, have invented a new and useful Corn Harvester and Husking Machine; and I do hereby declare the following to be a full, clear, and exact description of the invention, such as will enable others skilled in the art to which it appertains to make and use the same.

This invention relates to a new and useful corn harvesting machine.

An object of the invention is to provide a machine of this nature, for not only harvesting the corn, but for snapping the ears from the stalks, and husking the ears, the ears after having the husks removed are conveyed to one side of the machine and deposited in a wagon or receptacle; while the stalks are ground up and dumped upon a conveyer in order to be conveyed to one side of the machine, to be used as feed; whereas the husks drop between the husking rolls on to a conveyer, and are likewise conveyed to one side of the machine, to be used as feed or fodder.

One of the features of the invention is the provision of a machine for obtaining the foregoing result, provided with means of connection with the driving wheels, whereby the harvesting or cutting mechanism, the various elevating and conveying means, the snapping and husking rolls and grinding or chopping rolls may operate in sequence or coördinately.

In practical fields it may be found necessary to subject the minor details of construction to alterations, to which the patentee is entitled, provided the alterations fall within the scope of what is claimed.

The invention comprises further features and combination of parts, as hereinafter set forth, shown in the drawings and claimed.

In the drawings:—Figure 1 is a view partly in section and partly in elevation, illustrating the various features of construction of the improved machine. Fig. 2 is a view in side elevation. Fig. 3 is a view in elevation showing the opposite side of the machine. Fig. 4 is a sectional view on line 4—4 of Fig. 1. Fig. 5 is a sectional view on line 5—5 of Fig. 1. Fig. 6 is a sectional view on line 6—6 of Fig. 1. Fig. 7 is a sectional view on line 7—7 of Fig. 1. Fig. 8 is an enlarged detail perspective view of the lower forward end of the trough of the machine, more clearly showing the means for harvesting or cutting down the stalks and elevating them upwardly to the snapping and husking rolls. Fig. 9 is a detail view showing the connections between the conveyers 71 and 72, whereby they are operated. Fig. 10 is a detail view showing the connections between the beveled gear 144 and the pintle 138 of one of the rollers of the conveyer 71 for operating the same and the conveyer 72.

Referring more particularly to the drawings, 1 designates the frame of a machine. The forward end of the frame is provided with brackets 2, one on each side, one being shown in Figs. 1 and 2 and the other in Fig. 3. Journaled in the brackets 2, are forward supporting wheels 3, by means of the shaft 4. The rear end of the frame is provided with bearings 5, in which the axle or shaft 6 is mounted. Fixed on the axle or shaft 6 are the rear supporting wheels 7. Also fixed on the axle 6 is a sprocket 8 about which a chain 9 travels, which in turn passes about the sprocket 10 of the shaft 11, which is mounted in bearings of the brackets 12. Also journaled upon the shaft 11 is a sprocket 13 having a sprocket chain 14, the purpose of which will hereinafter appear. Mounted upon the shaft 11 is a beveled gear 15 meshing with the beveled gear 16 of the shaft 17, which is mounted in the bearings 18 of the brackets 19 and 20 of the frame 1. Upon the forward end of the shaft 17 is a disk wheel 21, to which a pitman 22 is eccentrically connected as at 23. This pitman 22 is in turn pivotally connected at 24 to an arm 25 of a sickle or cutting bar 26, mounted in guides 27 of the under face of the trough-shaped chute or elevator trough 28. This chute or elevator trough is bifurcated as shown at 29 in Fig. 8, thereby forming guide edges 30 to guide the stalks toward the sickle or cutting bar 26. It will be seen that by the foregoing gear connections with the rear axle or shaft 6, a reciprocating motion is imparted to the sickle or cutting bar 26, whereby the stalks are severed, as the machine is driven forward, in any suitable manner (not shown). As the stalks are severed or cut down they fall upon the chute or elevator trough, and are elevated by virtue of the sprocket chains 31 including their projections 32 to the chamber 33. The lower portions of the chains 31 pass about the sprockets 34, which rotate with the shaft 35, mounted in suitable bearings of the lower forward end of the chute or elevator trough. Also mounted in suitable bearings of the chute or elevator trough is a corrugated roller 36, which aids in throwing the stalks as they fall, upon the elevating chains 31. This roller 36 is operated by virtue of the chain connection 37, engaging the sprockets 38 and 39, the sprocket 38 being rotatable with the roller 36, while the sprocket 39 is rotatable with the shaft 35. The chute or trough 28 forms a part, in the present application of the upper portion 40 of the frame of the machine, and the bottom of the trough or chute is constructed with slots or openings 41, to permit of the reception of the sprockets 34. The upper portion of the elevating chains 31 pass about the sprockets 43, which are mounted upon the shaft 44. This shaft 44 is mounted in suitable bearings of the upper portion 40 of the frame 1 of the machine. Also upon the shaft 44 are sprockets 45, about which the chains 46 travel. These chains 46 are likewise provided with projections or spurs 47. The chains 46 together with the spurs 47 constitute means for feeding the stalks toward and between the snapping rolls 48, which are mounted in bearings 49 of the upper portion 40 of the frame 1. The chamber 33 is formed in the upper portion 40 in the frame 1, and the side walls of said chamber 33, as shown in Fig. 5 curve toward one another and toward the snapping rolls, thereby constituting means for deflecting the forward end of the stalks toward and between the snapping rolls.

As shown in Fig. 1 of the drawings, it will be seen that upon one end of the shaft 44 a wheel 50 is journaled having radial arms 51. This wheel 50 including the arms 51 constitutes a beater, which, as the stalks reach the chamber 33 strikes one end of each stalk, thereby forcing the same endwise into the chamber 33, and owing to the chains 46 together with the projections or spurs 47, the stalks are forced between the snapping rolls 48. The chains 46 pass about the sprockets 52, which are mounted upon the shaft 53, which is journaled in suitable bearings of the sides of the chamber 33. On one end of the shaft 53 is a sprocket 54, shown in dotted lines in Fig. 1 and in full lines in Fig. 3.

The chain 14 passes about a sprocket 55 of a stub shaft 56, which is carried by the lower portion of the frame 1. Also upon the shaft 56, and movable with the sprocket 55 is a gear 57, which meshes with the gear 58, which is mounted upon the shaft 59. This shaft 59 is mounted in suitable bearings of the lower portion of the frame 1, and upon the end opposite the gear 58 a pair of sprockets 60 and 61 are mounted. Passing about the sprocket 61 is a chain 62, which likewise passes about the sprocket 54. In this manner, it will be seen, motion is imparted to the shaft 53, which it will be readily seen in turn imparts motion to the chains 31 and 46, the beater and the corrugated roller 36.

Passing about the sprockets 60 is a sprocket chain 64, which in turn passes about the sprocket 65, upon the shaft 66. The shaft 66 shown clearly in Figs. 1, 2 and 3 is mounted in suitable bearings of the sides of the frame 1, and is provided with a roller 67. Passing about the roller 67 is a conveyer belt 68, having suitable slats 69, whereby the husks and some of the fodder, as they drop from the husking rolls 70, are conveyed rearwardly, in order to fall upon the conveyer 71, from which they are transferred to the conveyer 72. The other end of the conveyer belt 68 passes about the roller 73, which is also mounted in suitable bearings of the frame 1 of the machine.

Upon reference to Figs. 1 and 6 of the accompanying drawings, it will be observed that the husking rolls 70 have their pintles journaled in suitable bearings of the frame of the machine, and are arranged on an inclination, the bearings being indicated at 74 and 75. The husking rolls 70 are geared together by the gears 76, in order to drive the rolls toward one another and downwardly, so as to remove the husks from the ears of corn. The particular angle of the corrugations of the rolls 70 also assist in tearing or removing the husks from the ear. The husks drop between the husking rolls 70, while the ears gradually pass down the rolls 70, and fall upon the conveyer 77, from which they are transferred to the conveyer 78. It will be seen that the conveyer 78 slightly inclines upwardly, so as to pass the ears of corn out through the opening 79, shown clearly in Figs. 1 and 3, and after passing through the opening 79 the ears fall into a wagon, receptacle or other means, (not shown). The conveyer 77 passes about the rolls 80 and 81, while the conveyer 78 passes about the rolls 82 and 83. As shown in Figs. 1 and 6 the shafts 84 and 85 of the rolls 81 and 82 are geared together by the sprockets 86 and 87 and chain 88. The shaft 84 of the roller 81 is provided with a pinion 89, meshing with a similar pinion 90 on a stub shaft 91, which is mounted in a bearing of the frame of the machine. This pinion 90 in turn meshes with a beveled pinion 92 of one of the husking rolls, so that as the husking rolls are driven toward one another and downwardly, proper motion will be imparted to the conveyers 77 and 78.

On the shaft 17 is a beveled gear 93, which meshes with a beveled gear 94, which in turn rotates with the shaft 95, mounted in bearings 96 and 97 of the frame 1, the bearing 97 being arranged on the upper portion 40 of the frame of the machine. Upon the upper end of the shaft 95 is a beveled gear 98, which in turn meshes with a similar beveled gear 99 rotating with one of the pintles of one of the husking rolls. It will be seen that the shaft 17 receives motion from the beveled gear 15, and thereby imparts motion to the shaft 95, and owing to the beveled gear connections 98 and 99, the husking rolls 70 are driven toward one another and downwardly, and as before stated, the husks are removed or torn from the ears. After the ears including their husks are snapped from the stalks by the rolls 48 the stalks pass on their way between the rolls 48, while the ears with their husks fall upon the husking rolls 70, the inclined chute 100 guiding the ears including the husks to the rolls 70. The ears in passing down the chute 100 are assisted in their passage by the projections or lugs 47 of the chains 46.

Referring more particularly to Fig. 7 and also to Fig. 3 it will be seen that upon one end of the shaft 11 a beveled gear 101 is mounted, it also being indicated in Fig. 1. This beveled gear 101 meshes with the beveled gear 102 indicated in Fig. 1, and also clearly shown in Figs. 3 and 7, and which beveled gear 102 is mounted upon and rotatable with the shaft 103. The shaft 103 is mounted in suitable bearings 104 and 105, clearly shown in Fig. 3. Upon the upper end of the shaft 103, a beveled gear 106 is provided, which in turn meshes with a similar beveled gear 107 on the shaft 108, with which the roll 109 rotates. Also mounted upon and rotatable with the shaft 108 is a gear 110, meshing with a similar gear 111 of the shaft 112, which likewise rotates with the roll 113. The shaft 112 is provided with a sprocket 114 operating a chain 115, which in turn passes about the sprocket 116. The sprocket 116 rotates with the shaft 117 mounted in the bearings 118. On the shaft 117 a beveled gear 119 is movable therewith, and in turn meshes with and rotates the beveled gear 120 of the pintle 121 of one of the snapping rolls 48 (which are geared together by the gears 48ª), thus it will be seen that the snapping rolls are rotated toward one another and rearwardly as indicated by the arrow 122, Fig. 1. Also by the connections between the shaft 11 and the shaft 117 the rolls 109 and 113 are rotated toward one another and rearwardly, as indicated by the arrows 123, Fig. 1. It will be observed that the rolls 109 and 113 operate in the chopping chamber 124, that is, where the stalks, after leaving the snapping rolls 48 are ground or cut up, in order to pass out through the spout or chute 125, in order to be deposited upon the conveyer 71, and thence delivered to the conveyer 72, whence they fall upon a suitable wagon, receptacle or other means (not shown). The upper and lower walls of the cutting chamber 124 are of a contour concentric with the rolls 109 and 113, as shown in Fig. 1, and are provided with cutting knives 126 and 127, with which the cutting knives 128 and 129 of the rolls 109 and 113 coöperate, in order to chop or cut the stalks into small parts. The cutting knives 128 and 129 intermesh with one another as the rolls 109 and 113 rotate toward one another.

The conveyer 71 passes about the rollers 131 and 132, while the conveyer belt 72 passes about the rollers 133 and 134. The rollers 132 and 133 are connected by the sprockets 135 and 136 and the chain 137. In this manner the conveyer 72 is driven from the conveyer 71. Upon the pintle 138 of the roller 131 is a beveled gear 139 which meshes with the pinion 140, which is mounted upon and rotatable with the shaft 141 mounted in suitable bearings 142. On the lower rear end of the shaft 141 a beveled gear 143 is supplied, which meshes with the beveled gear 144, the same being mounted upon and rotatable with the shaft or axle 6. In this manner it will be observed that power from the axle or shaft 6 is transferred to the conveyers 71 and 72.

After the stalks are severed or cut down, they are conveyed upwardly through the chute or trough, and into the chamber 33. The stalks as they reach the chamber 33 are thrown endwise by the beater, the chains 46 carrying the stalks toward the snapping rolls. The stalks pass through the snapping rolls, which snap the ears of corn therefrom, which fall upon the slide or guide 100 to the husking rolls. From the ears the husks are torn or removed, the husks passing between the rolls on to the conveyer 68, while the ears of corn fall upon the conveyer 77 and are conveyed laterally of the machine. The husks are deposited or dumped from the conveyer 68 upon the conveyer 71, and are thence carried to one side of the machine by the conveyer 72. The stalks pass on their way between the snapping rolls 48, and are ground up by the cutting rolls 109 and 113, the ground stalks passing through the spout or chute 125 and on to the conveyer 71 with the husks or fodder, the husks or fodder and the ground stalks are designed to be used as suitable feed for animals.

There may be provided upon the axle 6 any suitable clutch connections (not shown) whereby the beveled gear 144 and the sprocket 8 may be thrown into and out of gear with the axle 6.

The invention having been set forth, what is claimed as new and useful is:—

In a machine for harvesting corn, a frame having forward and rear supporting wheels, the frame having a snapping roll chamber provided with snapping rolls and terminating at its rear in a stalk chopping or cutting chamber provided with stalk chopping rolls and having an outlet spout, said snapping rolls being inclined upwardly and slightly rearwardly, a husking chamber below the snapping roll chamber and provided with husking rolls inclined downwardly and rearwardly and arranged substantially at right angles to the lower ends of the snapping rolls, means for elevating the stalks to the mouth of the snapping roll chamber, a conveyer for conveying the stalks from the mouth to the snapping rolls, these means at their junctions including a beater at one side for beating the stalks endwise in position to pass between the snapping rolls, a conveyer for conveying the husks to the rear under the outlet spout, which husks and the ground stalks are designed to be conveyed to one side, and means for connecting the foregoing elements to the rear wheels, whereby the elements may operate coördinately.

In testimony whereof I have signed my name to this specification in the presence of two subscribing witnesses.

ELMER J. McCRABB.

Witnesses:
JOHN STAHL,
W. A. JACKSON.